Patented Apr. 13, 1943

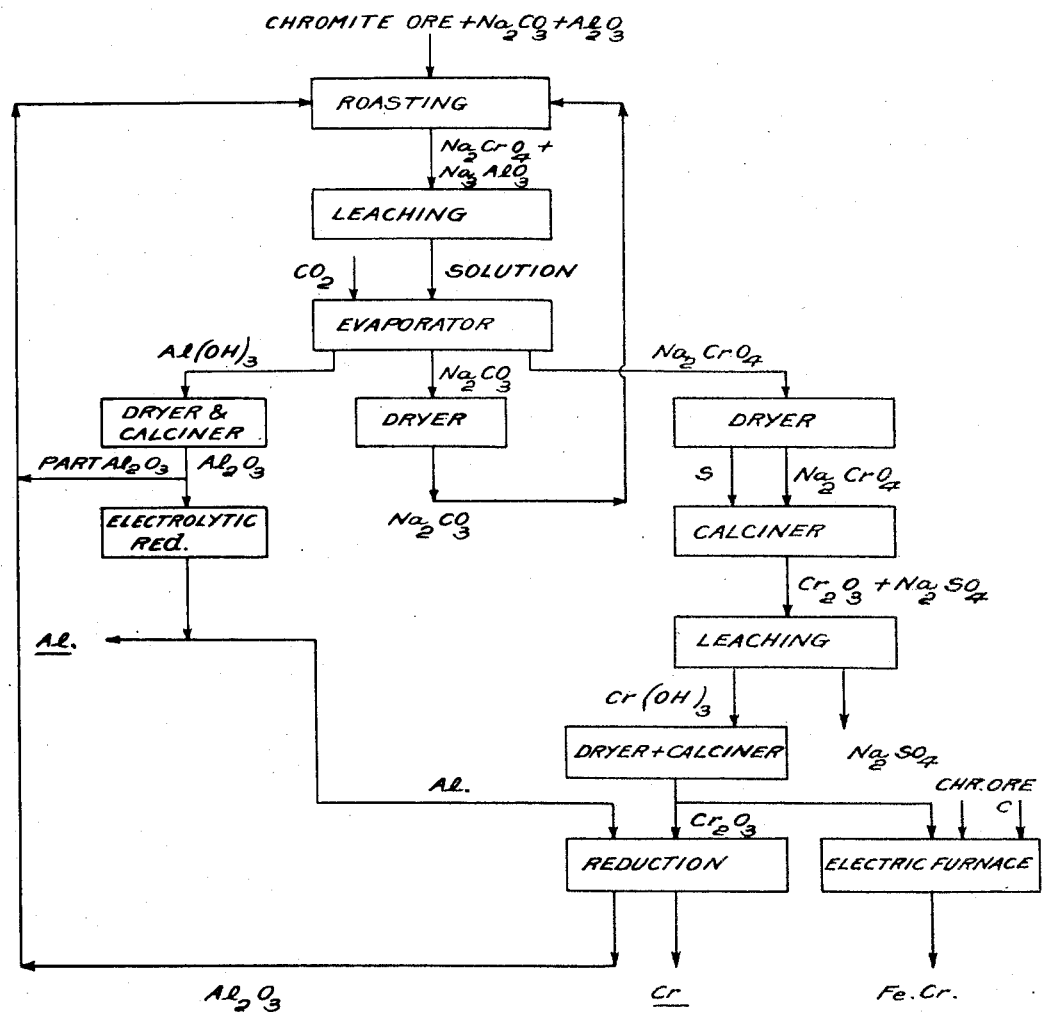

2,316,330

UNITED STATES PATENT OFFICE 2,316,330

PROCESS OF TREATING CHROMITE ORES, PARTICULARLY MASINLOC ORE TO OBTAIN THEREFROM ALUMINUM, CHROMIUM, AND OTHER PRODUCTS

Eugene M. Hawk, deceased, late of Manila, P. I., by Luz M. Hawk, administratrix, Manila, P. I.; vested in the Alien Property Custodian Application March 17, 1941, Serial No. 383,888

5 Claims. (Cl. 75—21)

This invention relates to the production of various compounds of chromium and aluminum such as carbon free chromium, ferrochromium and metallic aluminum from certain chromite ores containing a high percentage of aluminum oxide.

It has been the practice heretofore to obtain metallic aluminum from bauxite and from chromite ores. In the former case the bauxite has been treated with calcium oxide to form soluble sodium aluminuate. In this case, however, insoluble calcium silicate is produced from the silica contained in the ore appearing in the form of a gelatinous precipitate which hinders leaching and filtration. The use of calcium oxide in the roast results in the contamination of the ore residue with a large amount of material foreign to the ore, which makes it more difficult to separate the iron and magnesium oxides remaining in the residue, when it is desired to do so. Calcium oxide must be purchased or manufactured in fairly large amounts, and cannot be economically recovered for recycling as is the case when aluminum oxide is used.

The production of aluminum oxide from bauxite involves drying, crushing and grinding to 100 mesh, and mixing the ore with a solution of sodium hydroxide, which is then run to steam jacketed autoclaves and digested from 2 to 8 hours under 50 to 70 pounds pressure. The aluminum oxide of the bauxite is acted upon by the sodium hydroxide with the formation of sodium aluminate. The impurities ferric oxide and titania are unaffected by the sodium hydroxide, as is the greater part of the silica. Part of the silica is dissolved and reacts with aluminum oxide and sodium oxide to form insoluble double aluminum sodium silicate. Dissolution of silica is prevented by adding lime to the bauxite during fine grinding, and this subsequently causes the formation of insoluble calcium silicate and prevents loss of aluminum oxide. About 90% of the aluminum oxide in the bauxite is dissolved by the digesting treatment.

In practicing the present invention, however, two tons of chromite will yield the same amount of aluminum oxide as one ton of bauxite, together with sodium chromate and recovered sodium carbonate, the cost of processing being charged to three products instead of one, which is the case when bauxite is used.

The treatment of chrome ore for the production of aluminum as heretofore practiced is still an expensive process, as it has been necessary to add substantial amounts of aluminum oxide after each run. For example, it has been proposed to treat chromite ore with large quantities of bauxite to effect the production of sodium chromate with the simultaneous recovery of alumina. In these prior art efforts it has been necessary to use from 120 to 190 parts of bauxite to 100 parts of chrome ore to produce the required porosity of the mass and obtain satisfactory yields of sodium aluminate and alumina. Successive additions of bauxite must therefore take place for each cycle of chromite ore treatment resulting in the introduction of large quantities of waste products, such as silicates and iron compounds into the roast.

An object of the invention is to produce carbon free chromium, ferrochromium and carbon free aluminum in continuous cycles, using the aluminum oxide which is an end product of the previous cycle with the chromite ore in the next succeeding cycle.

A further object of the invention is to provide a process which is self-sufficient once it has been started. That is, for the production of the various compounds of chromium and aluminum, according to the present invention, sufficient aluminum oxide is formed to carry out the process without resorting to outside sources of supply. Also the reagents are recovered sufficiently pure for reuse.

Another object of the invention is to provide a process which is economical and which is workable in existing plants for the production of aluminum from bauxite and chromite ores.

Still another object of the invention is the production of the above compounds including carbon free chromium, ferrochromium and metallic aluminum from Masinloc chromite which is found in the Phillipine Islands. This Masinloc chromite contains a very high percentage of aluminum oxide.

Another object of the invention is the treatment of Masinloc chromite so as to produce chromic oxide in such manner that said chromic oxide will not affect the sale of other principal chemical products of chromium, such as sodium dichromate, chromic acid and lead chromate, the total of these products being equal to 87% of all chemical compounds of chromium produced.

I have found that the treatment of Masinloc chromite, a chrome ore found in certain parts of the Philippine Islands, in accordance with my improved process results in substantial savings over prior processes, and this is true because I use a chrome ore having a high percentage of aluminum oxide 29.4% such that the residue of aluminum oxide is sufficient when obtained as an end product to form the only additional aluminum oxide necessary for the next treatment (succeeding batch) of Masinloc chromite.

In fact Masinloc chromite contains sufficient aluminum oxide which if reduced to metallic aluminum, will in turn reduce to carbon free chromium, the total chromic oxide available from the same amount of ore.

Briefly the procedure is as follows: The ore is crushed and ground, mixed with sodium carbonate and aluminum oxide and roasted in a mechanical furnace for approximately 3 hours at a temperature range of 800–1100 C. Excess air in the furnace gases supplies the oxygen necessary for the reactions.

The principal reactions taking place during the roast may be postulated as follows:

$$4FeCr_2O_4 + 8Na_2CO_3 + 7O_2 = 2Fe_2O_3 + 8Na_2CrO_4 + 8CO_2$$

$$Al_2O_3 + 3Na_2CO_3 = 2Na_3AlO_3 + 3CO_2$$

The calcine discharged from the furnace is mechanically leached with hot water to dissolve and extract the soluble sodium chromate and sodium aluminate. The iron and magnesium oxides contained in the ore are not affected by roasting, and are discharged separately at the time leaching is completed. The leach water is filtered and pumped to a triple effect vacuum evaporator.

In the first effect, conversion of soluble sodium aluminate to insoluble aluminum hydroxide takes place with precipitation of same. Decomposition of sodium aluminate is effected by a small amount of carbonic acid, resulting in the conversion of sodium to carbonate which stays in solution and the aluminum to hydroxide, as a precipitate.

The precipitated aluminum hydroxide is withdrawn from the salt basket as formed, together with a certain amount of mother liquor, and pumped to a solid bowl continuous centrifuge. The solids are discharged from the centrifuge and the mother liquor returned to the first effect of the evaporator. The aluminum hydroxide is dried in a steam or air heated rotary drier, and as required calcined to aluminum oxide in a direct fired rotary furnace.

The aluminum oxide from calcination of aluminum hydroxide may be employed in part for mixture with chromite ore in the succeeding cycle. The remaining aluminum oxide is converted to metallic aluminum by thermal reduction in the electric furnace.

A portion of this metallic aluminum is then used for the reduction of chromic oxide recovered from the sodium chromate solution and in the reaction converted to aluminum oxide. This may be employed for mixture with ore in the succeeding cycle or reduced to aluminum in the electric furnace for treating succeeding batches of chromic oxide.

The remainder of the metallic aluminum may be used in producing carbon free ferrochromium as subsequently described. It is therefore unnecessary to resort to outside sources of supply to carry out the process for the production of these elements and alloys.

*Processing of sodium chromate*

After precipitation of aluminum hydroxide, the solution contains sodium chromate and sodium carbonate, and is fed to the second effect of the evaporator. Due to the great difference in solubility, the sodium carbonate crystallizes out upon concentration and the chromate remains in solution.

The sodium carbonate crystals are withdrawn and pumped to a screen type continuous centrifuge and the mother liquor returned to the evaporator. The sodium carbonate is then dried in a rotary dryer to a point where it becomes anhydrous, and is again used in the roasting of more chromite.

The remaining solution which contains sodium chromate only, is pumped to the third and final effect of the evaporator.

Sodium chromate in hot solution, has a solubility to infinity and therefore cannot be crystallized in the final effect. The solution, however, has a concentration of 30%.

This solution is discharged from the evaporator to a separate continuous vacuum crystallizer which further concentrates the solution to about 79%. This solution is discharged from the crystallizer, and upon cooling to 30° C. the sodium chromate crystallizes and is centrifuged, the mother liquor being returned to the crystallizer and the crystals dried as previously described.

The entire process as described is continuous. Process steam for the evaporation, is being supplied at 14.7 lbs. per sq. inch from the exhaust of the turbine generator.

The sodium chromate is then converted to chromic oxide by treatment with elemental sulphur or sulphur dioxide ($SO_2$ gas).

When sulphur is used, sodium sulphate is produced as a byproduct, in accordance with the following reaction:

$$4Na_2CrO_4 + 4S + 3O_2 = 2Cr_2O_3 + 4Na_2SO_4$$

With sulphur dioxide, sodium sulphate is also produced. The reaction being as follows:

$$4Na_2CrO_4 + 4SO_2 + 6H_2O = 4Cr(OH)_3 + 4Na_2SO_4 + O_2$$

Under conditions outlined in the proposed plant, sulphur would be a cheaper reagent than sulphur dioxide and is therefore chosen.

The conversion of sodium chromate to chromic oxide would be effected in the following manner.

Four parts, (by weight) of sodium chromate and one part of sulphur are mechanically pulverized and mixed in an inert atmosphere.

This mixture is then run to an externally heated furnace and heated for a short period at a temperature range of 300–500° C.

The calcine is mechanically leached in a solid bowl continuous centrifuge, the solids discharged being chromic hydroxide, and the liquid, sodium sulphate solution. The reactions involved being as follows:

$$4Na_2CrO_4 + 4S + 3O_2 + heat = 2Cr_2O_3 + 4Na_2SO_4$$

There is an intermediate stage in this process—when the calcine is leached, the chromic oxide precipitates as chromic hydroxide which is calcined in a rotary furnace to chromic oxide. The sodium sulphate in solution is crystallized in a triple effect vacuum evaporator.

Both the sodium chromate and aluminum hydroxide or oxide are obtained in a sufficiently pure state for conversion into metals or compounds, without further treatment.

*Sodium chromate as basic material for other products*

Starting with sodium chromate, the following compounds may be produced:

| | |
|---|---|
| Chromic acid | Potassium chromate |
| Lead chromate | Potassium dichromate |
| Sodium dichromate | Ammonium chrome alum |
| Chromium acetate | |

Thermo-reduction of chromic oxide by aluminum 2.41 parts of chromic oxide when mixed with 1 part of powdered aluminum, placed in a crucible furnace and ignited at one point, produces an exothermic chemical reaction which spontaneously spreads to the whole of the mixture. The aluminum used in reaction with chromic oxide is obtained from the oxide content of the ore and results from the electrolytic-reduction of the aluminum oxide. This reaction results in the oxidation of aluminum to oxide and the reduction of chromic oxide to metallic chromium with a final temperature of about 3000° C. At this temperature, the chromium is in a liquid state and separated from the aluminum oxide due to the difference in density. The liquid chromium is run into ingot molds and cooled. As there is no carbon present in the mixture, the chromium is carbon free. It is possible to obtain chromium 99.5% pure, by this method.

Production of chromium in the electric furnace

Alternatively the chromic oxide may be reduced directly in the electric furnace by heating a mixture of chromic oxide, coal or coke and flux, in the form of briquettes. The chromium produced contains varying amounts of carbon, depending upon conditions. The carbon content of the metal may be reduced by further treatment with an additional amount of chromic oxide.

Increasing chromium content of ferrochromium, produced from chrome ore in the electric furnace, by standard methods Chromic oxide mixed with chrome ore in the electric furnace reacts the same as the chromic oxide in the ore resulting in a higher percentage of chromium in the ferrochrome produced, without deviation from standard methods now in use. It may also replace chromite, in the decarbonization or refining of ferrochrome, resulting in more accurate control of the process and increased yield.

Direct production from Masinloc chromite of carbon free ferrochromium containing from 70 to 90% chromium by thermo-reduction Masinloc chromite when mixed with aluminum and ignited, results in the direct production of carbon free ferrochromium containing 70% Cr and 30% Fe.

By adding additional amounts of chromic oxide to the mixture, any chromium content up to 90% may be produced.

It is not assumed that Masinloc chromite would entirely replace bauxite in aluminum plants, but that it would be consumed in amounts required to balance supply with demand.

To effect this change, the following methods of procedure would be adaptable:

Chromite would be crushed, ground and mixed with aluminum. This mixture when ignited results in the production of ferrochrome and aluminum oxide. In addition to the amount of oxide secured from the aluminum used for thermo-reduction of chromic oxide, approximately 296 kilos aluminum oxide from the ore is present in the residue of the thermic reaction.

This "residue" is processed in a similar manner to that used in the treatment of bauxite for the recovery of aluminum oxide in a pure state, and in turn reduced to metallic aluminum.

One of the principal advantages of this process is that Masinloc ore in accordance with the present invention can be processed to obtain carbon free metallic chromium, metallic aluminum and ferro-chromium directly and without the addition of aluminum oxide from an outside source except at the beginning of the process. That is to say, the aluminum oxide obtained from the treatment of the ore derived from the sodium aluminate solution which is the result of calcination with sodium carbonate is reduced to metallic aluminum. Carbon free metallic chromium can then be produced by reaction with the metallic aluminum and aluminum oxide is reformed, which is either directly reduced to metallic aluminum or used for addition to the ground metallic ore for processing the next batch. This is obviously very desirable from an economical as well as a practical standpoint. It will be noted that by this process metallic aluminum and carbon free chromium are simultaneously produced. The process is particularly advantageous in view of the fact that the alumina content of the ore can be reduced to metallic aluminum and at the same time the total chromium oxide content is reduced to carbon free chromium.

Additionally, the aluminum resulting from processing the ore can be directly added to the Masinloc chromite for the production of carbon free ferrochromium by means of thermo-reduction.

In the preceding outline, the amounts of chromic, aluminum and magnesium oxides remaining in the unconverted chromite of the thermic reaction have been ignored. Numerous laboratory experiments have shown that the efficiency of this process ranges from 80 to 90%. An average of 85% efficiency is the basis used when calculating the yield of ferrochrome produced direct from chromite.

At 85% efficiency, 15% of the ore used remains with the residue as unconverted chromite.

If this residue is mixed with sodium carbonate and roasted for the primary purpose of converting the aluminum oxide content to sodium aluminate, the unconverted chromic oxide will be recovered in the leach water as sodium chromate and the aluminum oxide as sodium aluminate. This leach water, after precipitation of aluminum hydroxide, may be used repeatedly until the sodium chromate in solution reaches 30%. At this stage, the leach water is withdrawn and further evaporated, resulting in the recovery and crystallization of sodium chromate.

The above process results in a final residue with the following approximate analysis:

|  | Per cent |
|---|---|
| Magnesium oxide | 69.30 |
| Silicia | 13.93 |
| Ferric oxide | 7.99 |
| Calcium oxide | 7.42 |
| Titanium oxide | 1.36 |
| Total | 100.00 |

Masinloc chromite has substantially the following chemical analysis:

|  | Per cent |
|---|---|
| $Cr_2O_3$ | 33.46 |
| FeO | 13.07 |
| $SiO_2$ | 3.38 |
| $Al_2O_3$ | 30.38 |
| MgO | 16.91 |
| CaO | 1.81 |
| $TiO_2$ | .33 |

What is claimed is:

1. The process of treating chromite ore containing a very substantial amount of alumina in a continuous cycle, for the production of carbon free chromium, and metallic aluminum, comprising mixing a batch of the crushed chromite ore with aluminum oxide and sodium carbonate, roasting the mixture until the following reactions are obtained:

$$4FeCr_2O_4 + 8Na_2CO_3 + 7O_2 = 2Fe_2O_3 + 8Na_2CrO_4 + 8CO_2$$

$$Al_2O_3 + 3Na_2CO_3 = 2Na_3AlO_3 + 3CO_2$$

leaching the roasted product to extract the soluble sodium chromate and sodium aluminate, converting the sodium chromate to chromic oxide, converting the soluble sodium aluminate to aluminum oxide, converting at least a part of the aluminum oxide to metallic aluminum, and using a portion of said metallic aluminum for the reduction of said chromic oxide recovered from the sodium chromate solution to convert the same in the reaction to aluminum oxide, and using the latter as the added aluminum oxide with a new batch of the chromite ore.

2. The process of treating chromite ore containing about 30% of $Al_2O_3$ in a continuous cycle, for the production of carbon free chromium and metallic aluminum, comprising mixing a batch of the crushed chromite ore with aluminum oxide and sodium carbonate, roasting the mixture until the following reactions are obtained:

$$4FeCr_2O_4 + 8Na_2CO_3 + 7O_2 = 2Fe_2O_3 + 8Na_2CrO_4 + 8CO_2$$

$$Al_2O_3 + 3Na_2CO_3 = 2Na_3AlO_3 + 3CO_2$$

leaching the roasted product to extract the soluble sodium chromate and sodium aluminate, converting the sodium chromate to chromic oxide, converting the soluble sodium aluminate to aluminum oxide, converting at least a part of the aluminum oxide to metallic aluminum, and using a portion of said metallic aluminum for the reduction of said chromic oxide recovered from the sodium chromate solution to convert the same in the reaction to aluminum oxide, and using the latter as the added aluminum oxide with a new batch of the chromite ore.

3. The process of treating chromite ore containing a very substantial amount of alumina in a continuous cycle for the production of carbon free chromium and metallic aluminum, comprising mixing a batch of the crushed chromite ore with aluminum oxide and sodium carbonate, roasting the mixture until the following reactions are obtained:

$$4FeCr_2O_4 + 8Na_2CO_3 + 7O_2 = Fe_2O_3 + 8Na_2CrO_4 + 8CO_2$$

$$Al_2O_3 + 3Na_2CO_3 = 2Na_3AlO_3 + 3CO_2$$

leaching the roasted product to extract the soluble sodium chromate and sodium aluminate, converting the sodium chromate to chromic oxide, converting the soluble sodium aluminate to aluminum oxide, converting at least a part of the aluminum oxide to metallic aluminum, and reserving a part of said aluminum oxide for treatment of a subsequent batch of the said chromite ore, and using a portion of said metallic aluminum for the reduction of said chromic oxide recovered from the sodium chromate solution to convert the same in the reaction to aluminum oxide, and using the latter as the added aluminum oxide together with the reserved aluminum oxide with a new batch of chromite ore.

4. The process of treating Masinloc ores in a continuous cycle, for the production of carbon free chromium and metallic aluminum, comprising mixing a batch of crushed Masinloc chromite ore having substantially the following formula:

| | Per cent |
|---|---|
| $Cr_2O_3$ | 33.46 |
| FeO | 13.07 |
| $SiO_2$ | 3.38 |
| $Al_2O_3$ | 30.38 |
| MgO | 16.91 |
| CaO | 1.81 |
| $TiO_2$ | .33 | with aluminum oxide and sodium carbonate, roasting the mixture until the following reactions are obtained:

$$4FeCr_2O_4 + 8Na_2CO_3 + 7O_2 = 2Fe_2O_3 + 8Na_2CrO_4 + 8CO_2$$

$$Al_2O_3 + 3Na_2CO_3 = 2Na_3AlO_3 + 3CO_2$$

leaching the roasted product to extract the soluble sodium chromate and sodium aluminate, converting the sodium chromate to chromic oxide, converting the soluble sodium aluminate to insoluble aluminum hydroxide, recovering aluminum hydroxide and calcining the same to form aluminum oxide, converting at least a part of the aluminum oxide to metallic aluminum, and reserving a part of said aluminum oxide for treatment of a subsequent batch of the said chromite ore, and using a portion of said metallic aluminum for the reduction of said chromic oxide recovered from the sodium chromate solution to convert the same in the reaction to aluminum oxide, and using the latter as the added aluminum oxide together with the reserved aluminum oxide with a new batch of chromite ore.

5. The process of treating Masinloc ores in a continuous cycle, for the production of carbon free chromium and metallic aluminum, comprising mixing a batch of the crushed Masinloc chromite ore having substantially the following formula:

| | Per cent |
|---|---|
| $Cr_2O_3$ | 33.46 |
| FeO | 13.07 |
| $SiO_2$ | 3.38 |
| $Al_2O_3$ | 30.38 |
| MgO | 16.91 |
| CaO | 1.81 |
| $TiO_2$ | .33 | with aluminum oxide and sodium carbonate, roasting the mixture until the following reactions are obtained:

$$4FeCr_2O_4 + 8Na_2CO_3 + 7O_2 = 2Fe_2O_3 + 8Na_2CrO_4 + 8CO_2$$

$$Al_2O_3 + 3Na_2CO_3 = 2Na_3AlO_3 + 3CO_2$$

leaching the roasted product to extract the soluble sodium chromate and sodium aluminate, converting the sodium chromate to chromic oxide, converting the soluble sodium aluminate to aluminum oxide, converting at least a part of the aluminum oxide to metallic aluminum, and using a portion of said metallic aluminum for the reduction of said chromic oxide recovered from the sodium chromate solution to convert the same in the reaction to aluminum oxide, and using the latter as the added aluminum oxide with a new batch of the chromite ore.

LUZ M. HAWK,
*Administratrix of the Estate of Eugene M. Hawk, Deceased.*